(12) United States Patent
Cromarty et al.

(10) Patent No.: US 8,677,420 B2
(45) Date of Patent: Mar. 18, 2014

(54) PERSONAL MONITORING AND INFORMATION APPARATUS

(75) Inventors: Nicole Roxane Cromarty, Yardley, PA (US); Brian Jonathan Cromarty, Yardley, PA (US); Saurabh Mathur, Middlesex, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 540 days.

(21) Appl. No.: 11/795,449

(22) PCT Filed: Jan. 31, 2005

(86) PCT No.: PCT/US2005/003074
§ 371 (c)(1),
(2), (4) Date: Jul. 17, 2007

(87) PCT Pub. No.: WO2006/085844
PCT Pub. Date: Aug. 17, 2006

(65) Prior Publication Data
US 2008/0052751 A1    Feb. 28, 2008

(51) Int. Cl.
*H04N 7/16*    (2011.01)
(52) U.S. Cl.
USPC .............................................. 725/62; 725/98
(58) Field of Classification Search
None
See application file for complete search history.

(56) References Cited

U.S. PATENT DOCUMENTS

| | | | | |
|---|---|---|---|---|
| 5,894,320 A * | 4/1999 | Vancelette | ..................... | 725/138 |
| 6,020,930 A * | 2/2000 | Legrand | ......................... | 725/41 |
| 6,544,121 B2 * | 4/2003 | DeWeese et al. | ................ | 463/30 |
| 6,578,203 B1 * | 6/2003 | Anderson et al. | .............. | 725/141 |
| 6,934,510 B2 | 8/2005 | Katayama | | |
| 6,973,667 B2 * | 12/2005 | Fritsch | ............................ | 725/88 |
| 6,981,045 B1 * | 12/2005 | Brooks | .......................... | 709/226 |
| 2001/0039209 A1 * | 11/2001 | DeWeese et al. | ................ | 463/40 |
| 2002/0115454 A1 | 8/2002 | Hardacker | | |
| 2002/0176000 A1 | 11/2002 | Katayama | | |
| 2003/0041334 A1 * | 2/2003 | Lu | ................... | 725/113 |
| 2003/0112354 A1 * | 6/2003 | Ortiz et al. | ............... | 348/333.01 |
| 2004/0032495 A1 * | 2/2004 | Ortiz | ............................. | 348/157 |
| 2004/0078825 A1 * | 4/2004 | Murphy | ........................ | 725/109 |
| 2004/0220862 A1 | 11/2004 | Jackson | | |

FOREIGN PATENT DOCUMENTS

| | | |
|---|---|---|
| EP | 1 113 669 A2 | 7/2001 |
| EP | 1113669 | 7/2001 |
| JP | 2001-265562 A | 9/2001 |
| JP | 2002-335572 A | 11/2002 |
| JP | 2003101983 | 4/2003 |
| JP | 205501482 | 1/2005 |
| JP | 2007-525038 T | 8/2007 |
| WO | 2004/064300 A2 | 7/2004 |
| WO | WO2004064300 | 7/2004 |

* cited by examiner

*Primary Examiner* — Cai Chen
(74) *Attorney, Agent, or Firm* — Robert D. Shedd; Vincent E. Duffy; Joel M. Fogelson

(57) ABSTRACT

The present invention relates to portable video decoder devices that are used by sporting enthusiasts to monitor and access real time information concerning a sporting event. The present invention comprises a receiver which includes a touch screen display, keypad, audio and other media input and output ports which allows the user to monitor the statistics of a live sporting event and further access up to date information related to the event. A transmitter scheme is also disclosed for transmitting a plurality of media feeds related to an event where such media feeds are derived from source media feeds.

11 Claims, 8 Drawing Sheets

US 8,677,420 B2

PERSONAL MONITORING AND INFORMATION APPARATUS

This application claims the benefit, under 35 U.S.C. §365 of International Application PCT/US2005/03074 filed Jan. 31, 2005 which was published in accordance with PCT Article 21(2) on Aug. 17, 2006 in English.

FIELD OF THE INVENTION

The invention is related to the field of video decoder devices, specifically portable video decoder devices capable of receiving multiple streams of video content.

BACKGROUND

Since the early years of televised organized sports, sports enthusiasts have been interested in the details and statistics of sporting events. These statistics may include those for an individual game, season totals and lifetime totals, history and records for both the teams and the individual players. With the increase of sports television and radio channels, sports publications and the Internet, more information is available to the sports enthusiast than ever before. However, there has been no reliable and efficient method to supply this data to the sports enthusiast who is at a sporting event.

Sports enthusiasts are not averse to bringing their own electronic equipment to sporting events to enhance their experience. For instance, sports enthusiasts bring personal radios and televisions to sporting events to view the event on the television set while hearing the professional sports commentary of the game via the radio. These sporting event enthusiasts however may not want to use multiple devices to access the various television and radio feeds that are used to describe a sporting event. In addition, multiple video feeds may exist for the same sporting event, but a user would have no way of simply accessing such feeds because either multiple video devices would be required to receive such feeds or stadiums may not have an infrastructure that makes the availability of such feeds readily available.

SUMMARY OF THE INVENTION

The present invention relates generally to a personal video monitoring and information apparatus for monitoring and accessing real time information concerning an event. Multiple keys are provided on the personal video-monitoring device; with keys being used to select media feeds corresponding to the event.

BRIEF DESCRIPTION OF THE INVENTION

The invention is illustrated in the accompanying drawings in which.

DETAILED DESCRIPTION OF THE INVENTION

In the described embodiments of the present invention, the personal monitoring and information device is a portable device that is generally meant to be under the control of a single user or shared by a small number of users. Through a keypad or a touch sensitive screen, a user may access information relating to an ongoing sporting event or historical information about a participant in the sporting event, a team in the sporting event, the venue of the sporting event, a sponsor of a sporting event, or a vendor at the sporting event. A user may also access information relating to sporting events occurring concurrently with the present event and may also access audio and video transmissions related to the ongoing or concurrent sporting events.

Figure 7:
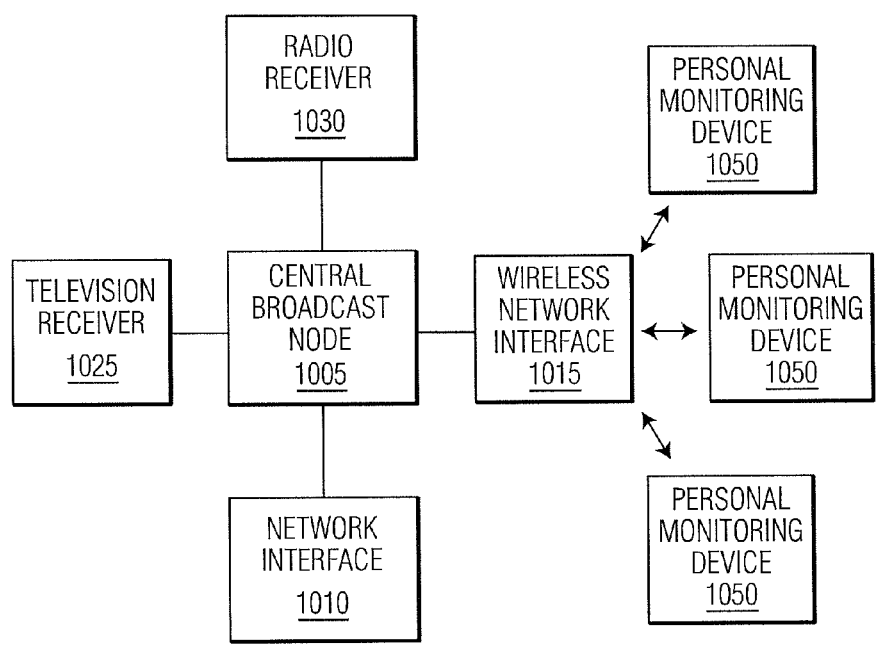
FIG. 7 illustrates an exemplary block diagram of a wireless based infrastructure used to implement the personal monitoring and information apparatus.

The information (data) and audio and video transmissions are transmitted via a wireless signal to the personal monitoring devices located at an event. As shown in FIG. 7, a central broadcast node 1005 coordinates the wireless transmission of audio, video, and data content to personal monitoring devices 1050. Specifically, central broadcast node 1005 receives video information (such as television channels or streamed video as examples of video source media feeds) that are received from television receiver 1025, where such video information are to be selected from formats such as ATSC, NTSC, SECAM, PAL, DVB-T, DVB-H, MPEG-2 encoded video, H.264 encoded video, WINDOWS MEDIA 9 encoded video, REAL PLAYER encoded video, and the like. Preferably, multiple video information sources (channels) are received by television receiver 1025 and are transferred via fiber channel to central broadcast node 1005.

Radio receiver 1030 operates in a similar manner to television receiver 1025 where multiple RF and satellite radio based audio information (audio source media feeds) are capable of being received at the point of receiver 1030. Preferably, a fiber channel or other type of network connection is used to couple radio receiver 1030 to central broadcast node 1005. Network interface 1010 represents a broadband connection that is used for communicating with information resources (for data source media feeds) through the Internet such as web sites and searchable databases, with real time updates. Preferably, the Internet connection is TCP/IP based, although other transport mechanisms such as RTP may be used for large downloads of information. Network interface 1010 may optionally be used to receive video and audio content through the Internet in the form of streaming media. Such formats of video and audio information can be for example streamed MP3 files for audio and H.264 encoded video and the like.

Central broadcast node 1005 contains appropriate software to transcode received audio, video, and data into a format that is capable of being transmitted through wireless network interface 1015 to personal monitoring device 1050. For instance, ATSC based video received through television receiver 1025 is not typically in a format that may be used by personal monitoring device 1050. Hence, software is utilized in central broadcast node 1005 to transcode the received video signal into a format that is capable of being streamed such as WINDOWS MEDIA 9, VC-1, H.264. Similarly, software is used to transcode received RF and satellite audio information received from radio receiver 1030 to streaming media by central broadcast node 1005. The transmitted video, audio, and data are known as media feeds.

In an optional embodiment of the present invention, the transcoding process retains auxiliary data that was transmitted as part of the original data stream. Such a device is helpful in the case where a broadcaster transmits video or audio with auxiliary information in the user data areas such as for ATSC, DVB-H, MPEG-2, and the like. Additionally, information in the headers of such packets or guide information such as PSIP data is retained in the transcoding process. Hence, if an ATSC television program is transmitted with sports score information, central broadcast node 1005 parses the received video signal for auxiliary information and transcodes such information into the physical and/or transport layer of the streaming media format selected to be broadcasted to personal monitoring device 1050.

In a second optional embodiment of the present invention, the central broadcast node 1005 may do partial transcoding operation by converting the received video, audio and auxiliary signals to a format appropriate for the personal monitoring device 1050. Personal monitoring device 1050 may itself do a further transcoding operation of the received media stream. For example, the personal monitoring device can perform scaling and cropping 1050 based on its own screen size. This allows personal monitoring device 1050 to be made available in several form factors without the burden of doing a per-device-type transcoding at the central broadcast node 1005.

Once data is transcoded by central broadcast node 1005, wireless network interface 1015 is used to transmit such data wirelessly to personal monitoring devices. One approach for broadcasting data makes use of having personal monitoring device 1050 retain a wireless receiver compatible with 802.11 (b), 802.11(g), and the like. Wireless network interface 1015 transmits each video or audio feed on a different wireless channel, where personal monitoring device 1050 selects a unique channel is response to the desired video or audio feed to be received.

For example, if a user were watching a baseball game with associated video feeds corresponding to first, second, and third base, a first transmission channel would be used to select the video feed corresponding to first base and a second transmission channel would be used to select the video feed for second base.

The information indicating what transmission channel corresponds to what video feed may be transmitted to personal monitoring device 1050 via a dedicated control channel that is known to the personal monitoring device a-priori.

In an optional embodiment of the present invention, personal monitoring device 1050 is equipped with a plurality of wireless network interfaces. In this case the personal monitoring device may receive multiple feeds simultaneously. For example, video, audio and auxiliary data may be sent on multiple radio channels. Personal monitoring device 1050 would simultaneously receive these multiple feeds and it may then choose to present the feeds in any combination, either after doing a local transcode or without it. For example, personal monitoring device 1050 may receive video feed on channel 1 (logical or physical), score data on channel 2, and audio data corresponding to an audio feed from a radio station on channel 3. Personal monitoring device 1050 would then integrate video, audio, and data together in a manner consistent with what is shown in FIGS. 2-8.

A second optional embodiment, personal monitoring device 1050 connects to an IP address associated with wireless network interface 1015. Wireless network interface 1015 may have a single or multiple IP addresses. Once personal monitoring device 1050 connects to wireless network interface 1015, the port address associated with each IP address is used to denote different feeds. For example, IP address 192.168.0.10 port 6000 would correspond to a video feed corresponding to first base and IP address 192.168.0.10 port 6010 would correspond to a video feed corresponding to the second base. Score data may be made available on 192.168.0.10 port 6020. The synchronization of various feeds (audio, video and auxiliary data) may be done using protocols like Real Time Protocol (RTP).

In another embodiment, the personal monitoring device may receive the feeds from multiple central broadcast nodes 1005. This may be beneficial for overcoming fading and other negative channel conditions.

Figure 1:
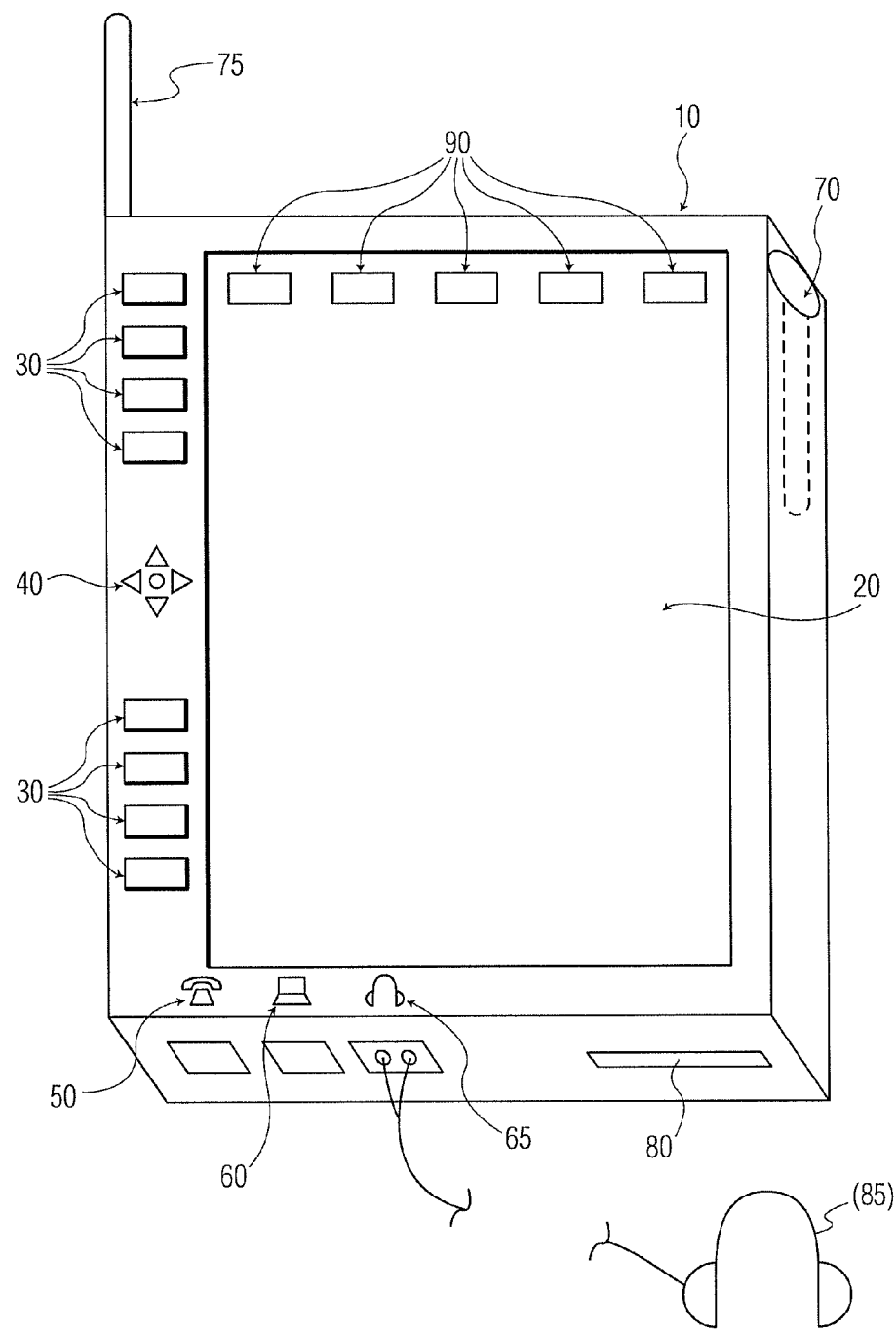
FIG. 1 is an exemplary pictorial view of a personal monitoring and information apparatus.

The exemplary embodiment of the personal monitoring and information apparatus depicted in FIG. 1 shows personal monitoring device 10 with display 20 that is optionally touch sensitive, and softkeys (keypads) 30,40. Display 20 (as an example of an output interface) may be monochrome, a color LCD display, OLED based display, and the like. Display 20 may be configured with additional "soft keys" 90 that are configured to suit the particular application being displayed which may be accessed via the touch sensitive option or through the keypad. 30,40. The hand held device may optionally include or integrate a stylus 70 to facilitate the use of the touch sensitive option.

As further shown in FIG. 1, personal monitoring device 10 has telephone connector 50 for receiving information via a telephone network, a computer interface connector 60 for receiving information via a computer network and at least one fixed, retractable, a RF receiver 75 for receiving information wirelessly via a radio frequency transmitter or wireless network. Personal monitoring device 10 is equipped with an audio headphone jack 65 (as an example of an output interface) which facilitates the attachment of headphones 85 to allow the user to listen to audio transmission made to the personal monitoring apparatus. Optionally the personal monitoring apparatus may be outfitted with an audio speaker of appropriate size (output interface).

Personal monitoring device 10 is equipped with a memory interface 80 where an external memory card may be attached, such as a COMPACTFLASH memory card. This card facilitates the storage of greater amounts of information that could then subsequently be accessed by the user of personal monitoring apparatus. A card in memory interface 80 permits a user store to information from the current event being viewed, import information not transmitted to the apparatus into the apparatus, information stored from previous events, information accessed from sources other than the above mentioned transmission mediums, such as the internet, or information provided by third party vendors. The user may tailor this information to further enhance the sporting event experience.

Figure 8:
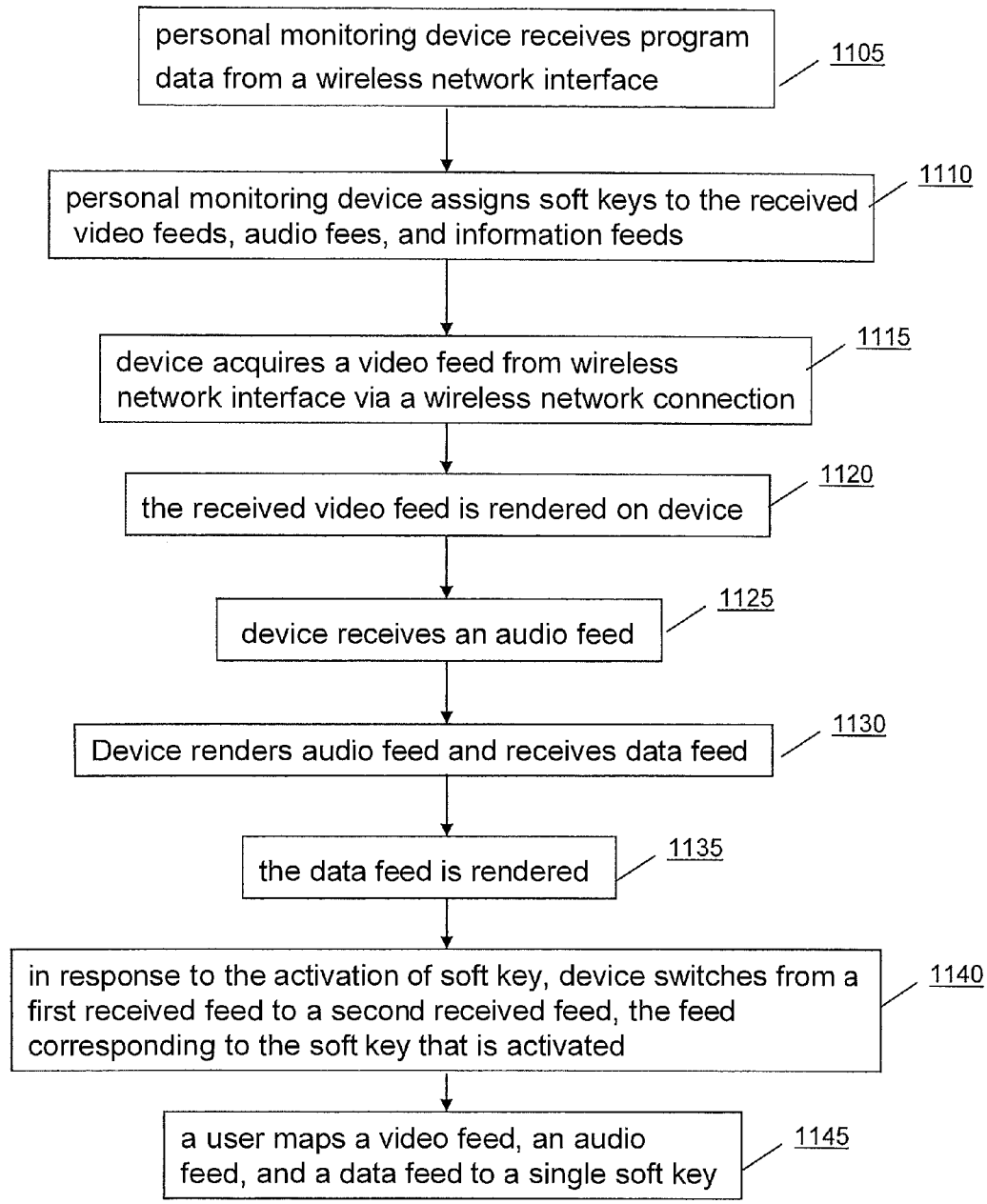
FIG. 8 illustrates a block diagram of a method for selecting media feeds using a personal monitoring device.

The operation of soft keys 90 and personal monitoring device 1050 is shown in FIG. 8, which describes a method 1100 for receiving programming representing several different video channels. In step 1105, personal monitoring device 1050 receives program data from a wireless network interface 1015, such data indicates which channels or IP addresses contain video, audio, and informational data that are related to a broadcast event. For example, this information may be a modified form of a program address table identification information that lists IP addresses and ports for different video feeds, audio feeds, and information fees. Preferably, these IP addresses accommodate IP multicasting feeds.

Step 1105 may also be done where a program address table identifies packet header information that corresponds to different program streams, where packets with one type of header information correspond to video data and packets with a second type of header correspond to audio data. Preferably, these IP addresses accommodate IP multicasting feeds.

In step 1110, personal monitoring device 1050 assigns soft keys 90 to the received video feeds, audio fees, and information fees. For example, if personal monitoring device 1050 has three soft keys 90, one soft key 90 is used for changing video feeds, one soft key 90 is used for changing audio feeds, and one soft key 90 is used for changing information feeds. Personal monitoring device 1050 may use a received PAT for this function where upon pressing any of the soft keys 90, device 1050 would change from one IP address and port to a second IP address and port.

In step 1115, device 1050 acquires a video feed from wireless network interface 1015 via a wireless network connection, in a manner consistent with the illustrative embodiments of the present invention. In step 1120, the received video feed is rendered on device 1050. In step 1125, device 1050 receives an audio feed where such a feed is rendered in step 1130. Similarly, in step 1130, a data feed is received and in step 1135, the data feed is rendered in a manner consistent with the illustrative embodiments of the present invention. It is noted that personal monitoring device 1050 may operate where either one or two of the described feeds above are used, at one time. This operation of turning on and off whether video, audio, or data feeds are rendered may be done with additional soft keys 90, or any other type of control interface.

In step 1140, in response to the activation of soft key 90, device 1050 switches from a first received feed to a second received feed, the feed corresponding to the soft key 90 that is activated. For example, if soft key 90 corresponds to audio feeds, the activation of soft key 90 would cause device 1050 to switch from a first audio feed to change to a second audio feed. Other examples of this step are contemplated.

In optional step 1145, a user maps a video feed, an audio feed, and a data feed to a single soft key 90. This step permits a user to easily which from one combination of feeds to a second combination of feeds. This mapping may be accomplished by pressing down on soft key 90 for several seconds. Device 1050 therefore would associate a key press of this soft key 90 to this predetermined mapping. Other soft keys 90 may be used other feed combination, in accordance with the principles of the present invention.

Figure 2:
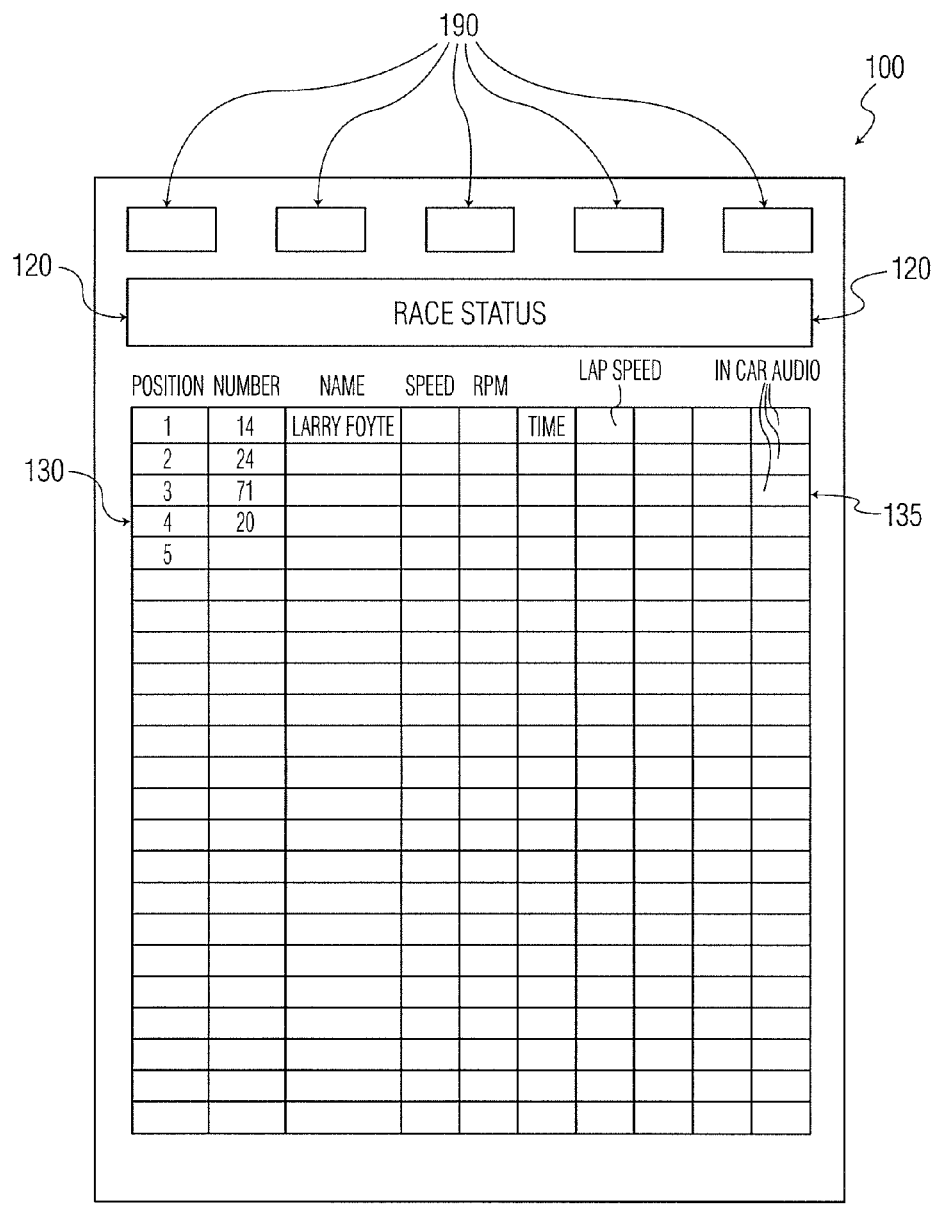
FIG. 2 illustrates an exemplary display format for auto racing information as it could be displayed on a monitoring and information apparatus.

FIG. 2 illustrates an exemplary display format for showing auto racing information 100 as it could be displayed on a personal monitoring apparatus. Soft keys 190 are incorporated into the graphical user interface to increase the possibility of the number of single touch keys that can be accessed by the user. The number of keys and their location depends on the application and possibly the preference of the user. The display also comprises a race status section 120 which may provide information on the current race. This may include information such as lap count, flag status, time, race duration, leaders, lead changes, caution counts, caution laps, and time under caution. A third portion of the exemplary display format shows participants table 130 listing the participants in a race. Information that may be included for each participant are position number, car number, name, sponsor, time behind leader, current lap, number of laps led, etc. The top line of the spreadsheet would list the different information stored below it each column and would optionally allow the user to sort the information in the table with respect to that column. For example, if a user wished to know which participant had led the most laps, the user could optionally activate the "laps led" column and the information would optionally be sorted in a descending order from most laps led to least laps led. Activating the "laps led" column again would cause the information to be sorted in an ascending order.

Figure 6:
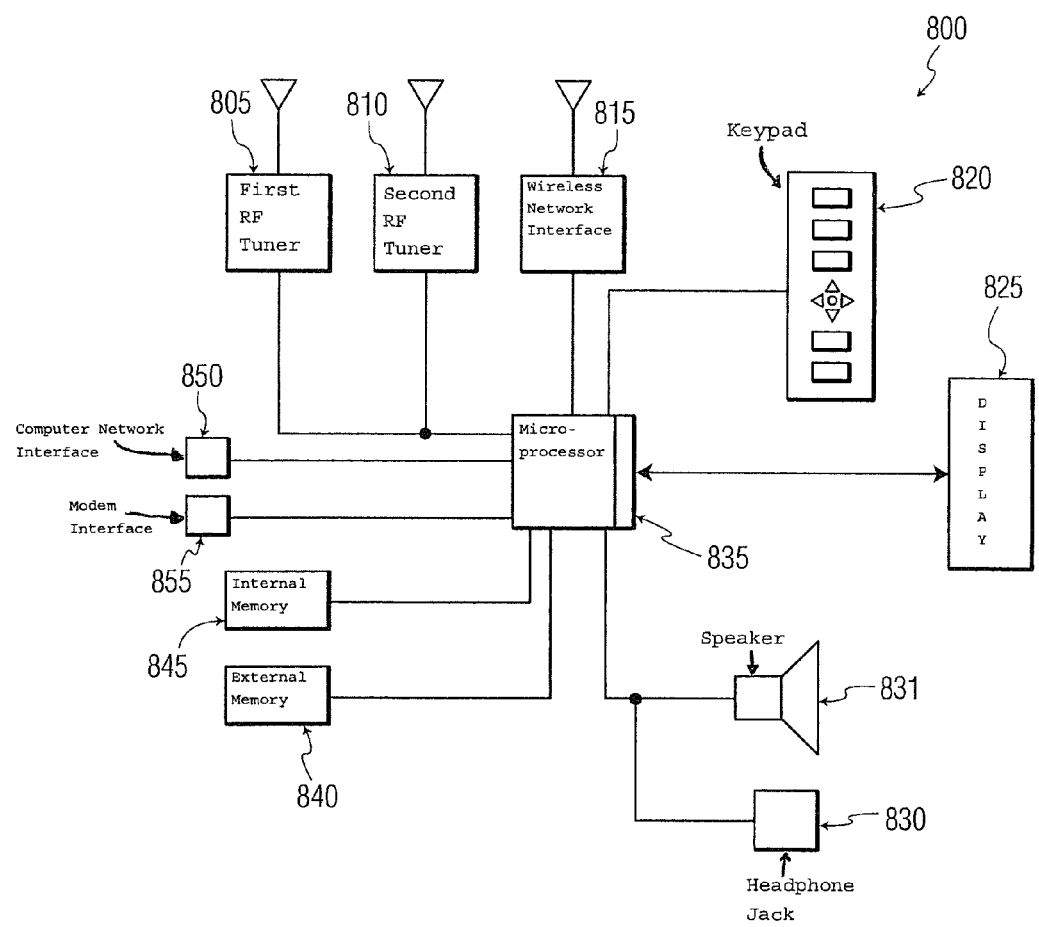
FIG. 6 illustrates an exemplary block diagram of the electronic circuitry of a personal monitoring and information apparatus.

Optionally, one of the columns 135 in participants table 130 may select in car audio for each respective participant. This operation would then adjust the electronics of the personal monitoring apparatus such that the in car audio of the selected participant would be output to the headphone jack 65. Optionally, if a user selects a participants name from participants table 130, the screen may change to the exemplary display format for displaying real time and historical information on participants in sporting events as depicted in FIG. 6. If the length of entries in participants table 130 is less than the number of participants in the event, the table may either be compressed to allow all the participants to be displayed or the software of the personal monitoring apparatus may allow the user to scroll through participants table 130 while a set number of entries are displayed. Activating any of the other information provided in participants table 130 could subsequently have similar results to those described above, such as activating the drivers sponsor information would activate a display providing information about the sponsor.

Figure 3:
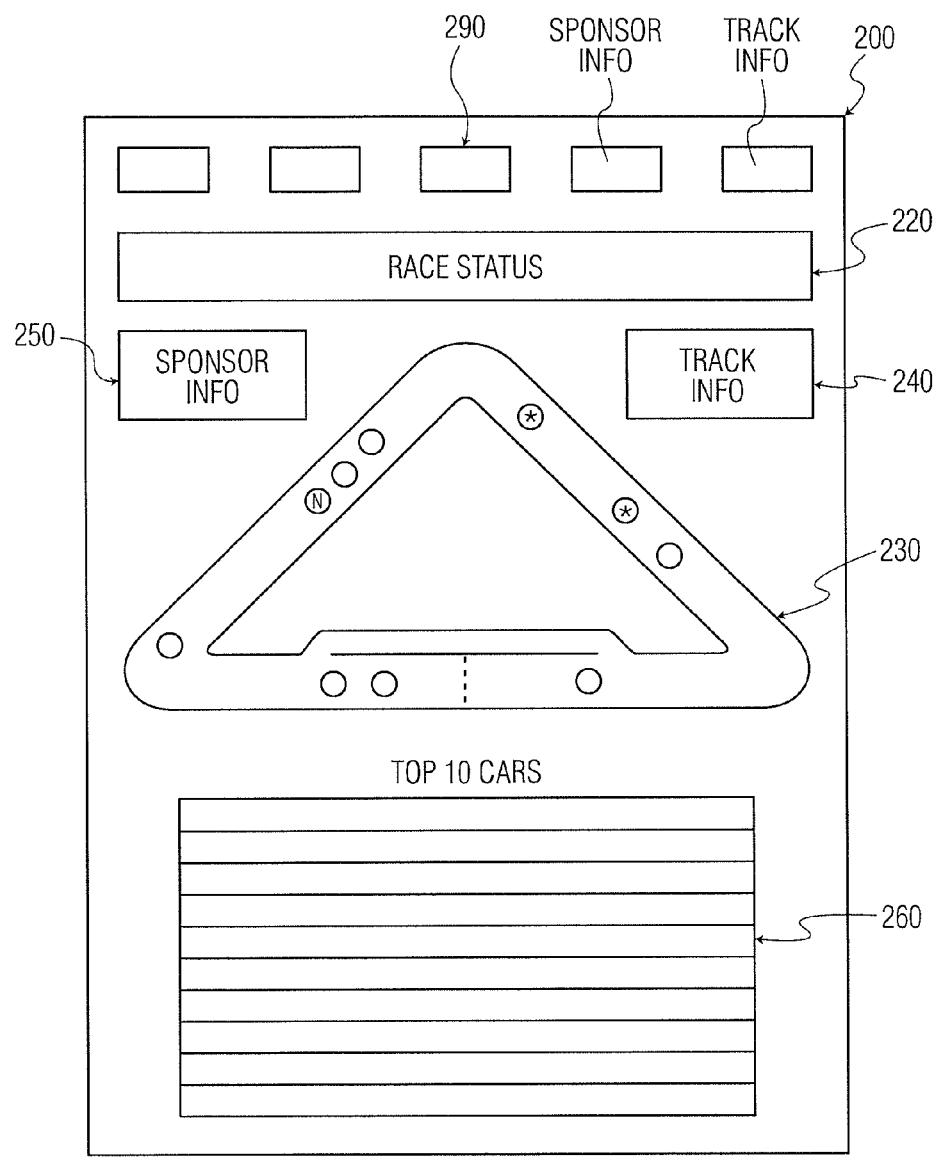
FIG. 3 illustrates a secondary exemplary display format for auto racing information as it could be displayed on the personal monitoring and information apparatus.

FIG. 3 illustrates a secondary exemplary display format for auto racing information 200 as it could be displayed on the personal monitoring apparatus. This display is similar to that depicted in FIG. 2 except that a racetrack graphic 230 is displayed. If the participants in the race are equipped with a Global Positioning Systems or a similar system and the locations of the participants can be determined by the central transmitting station, the location of the participants with respect to the track and each other can be transmitted to the personal monitoring apparatus. This could then optionally provide the user with a graphical view of the track and the position of one or more participants. The user selects which participants and the number of participants displayed on the racetrack graphic 230. To facilitate the space required for the racetrack graphic, the number of participants listed in participants table 260 would be reduced from that depicted in FIG. 2. The reduced version of participants table 260 would operate in a manner similar to that described in FIG. 2. Options such as soft keys, 210 track information 240, sponsor or advertiser information 250, race status 220 could also be included at the option of either the user or the system administrator. Soft keys 290 may be used to select between different modes.

Figure 4:
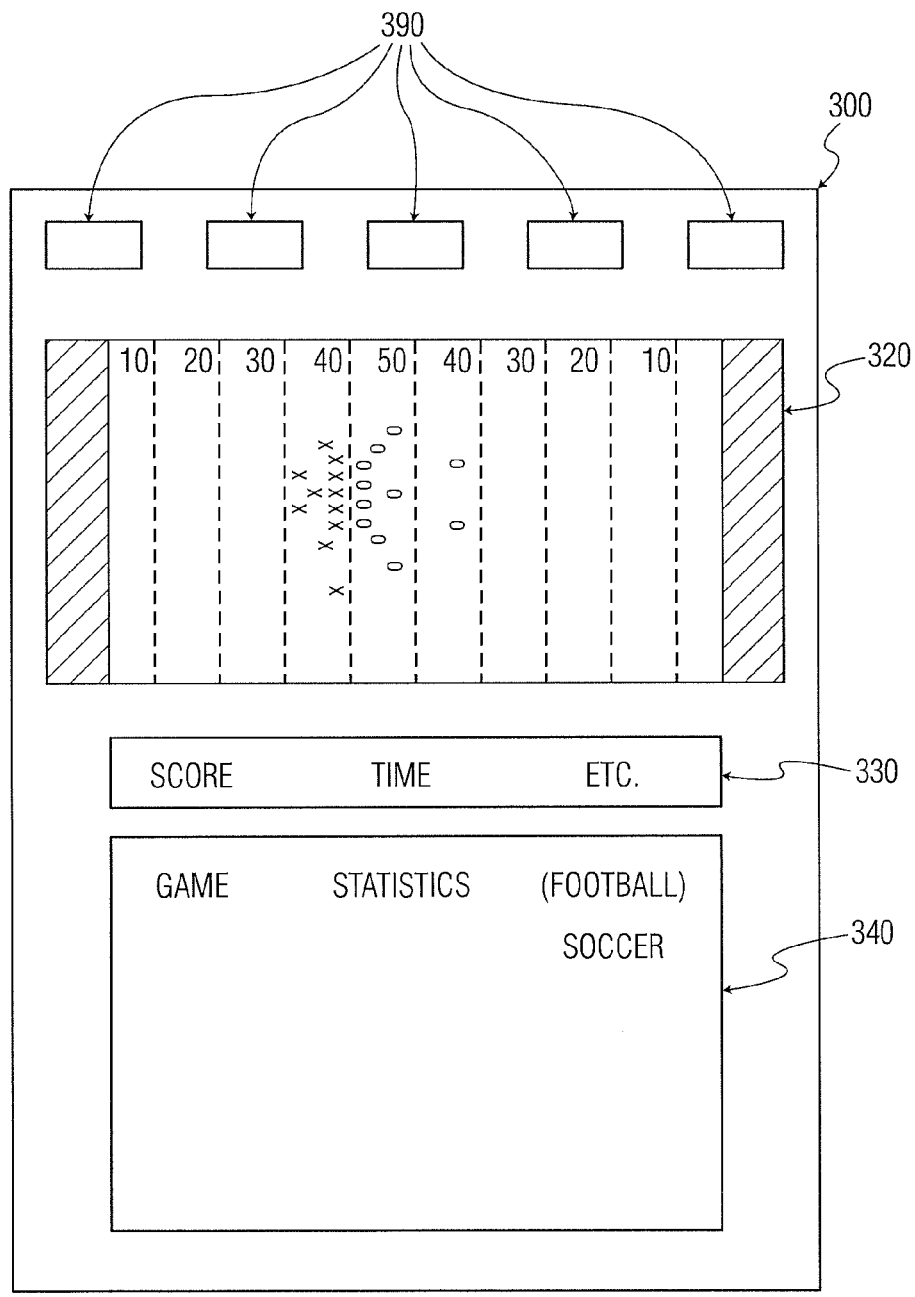
FIG. 4 illustrates an exemplary display format for football information as it could be displayed on the personal monitoring and information apparatus

FIG. 4 illustrates an exemplary display format for football information 300 as it could be displayed on the personal monitoring apparatus. Apparatus 300 displays information that is toggled via soft keys 390; such information being presented in areas such as game status section 330 and participants table 340. The exemplary display format for football information 300 could optionally include a football field graphic 320 that operates in a manner similar to that described for the racetrack graphic 230 in FIG. 3. Other information, such as sponsor or advertising information may also be included for apparatus 300.

Figure 5:
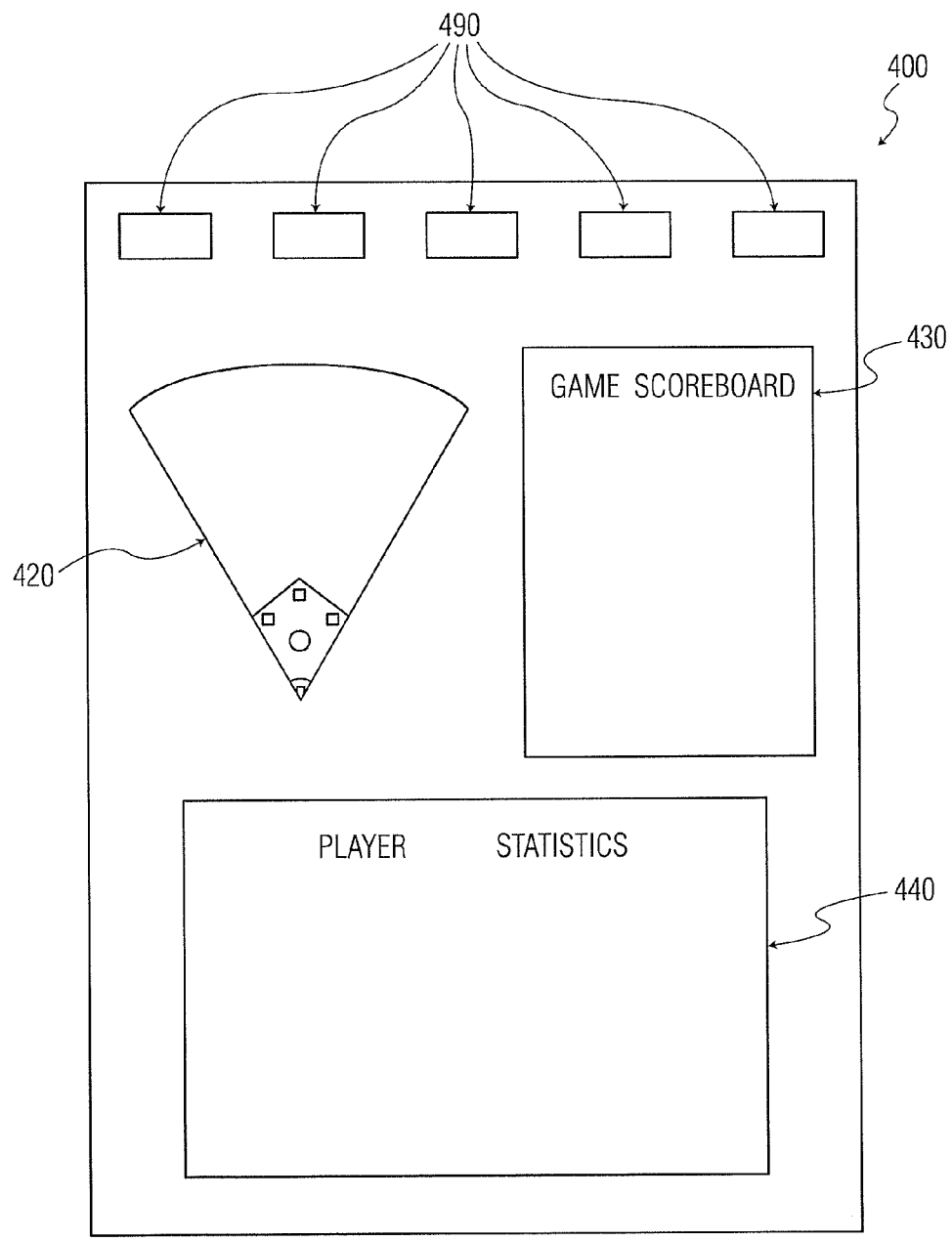
FIG. 5 illustrates an exemplary display format for baseball information as it could be displayed on the personal monitoring and information apparatus.

FIG. 5 illustrates an exemplary display format for baseball information 400 as it could be displayed on the personal monitoring apparatus. The display for baseball information 400 displays information that are toggled using soft keys 490; such information being presented areas such as game status section 430 and a participants table 440. The exemplary display format for baseball information 400 could optionally include a baseball field graphic 420 that operates in a manner similar to racetrack graphic 230 or football graphic 320. Other information, such as sponsor or advertising information may also be included on the exemplary display format for baseball information.

FIG. 6 illustrates an exemplary block diagram of the electronic circuitry 800 for a personal monitoring and information apparatus. Electronic circuitry 800 of the personal monitoring and information apparatus has a control microprocessor 835 that operates the various input sources and output interfaces that are used for a personal monitoring apparatus. For example, microprocessor 825 accepts input signals from RF tuners 805, 810 and wireless network interface 815. First RF tuner 805 is capable of receiving television signals broadcasted over the airwaves, such as NTSC, ATSC, DVB-H, and the like. Second RF tuner 810 may optionally be included for receiving additional transmission such as AM or FM radio broadcasts, additional television broadcasts, and the like. Wireless interface 815 operates wireless communications between a personal monitoring device and a wireless network interface 1015 (through the use of a wireless standard as 802.11b and 802.11g). Such transmissions may be video, audio, and data feeds, as described above.

Electronic circuitry 800 of personal monitoring apparatus further comprises keypad 820 for receiving commands from a user, and display screen 825 is used for displaying video and information. Display screen 825 also can display video information or video broadcasts received by or stored by the personal monitoring apparatus. If display screen 825 is equipped with touch sensitive features, display screen 825 may also be used to receive information in a manner similar to that of the keypad. 820. Electronic circuitry may further comprise optionally headphone jack 830 and audio speaker 831 for playing audio information or audio broadcasts received by, or stored by, the personal monitoring apparatus. Electronic circuitry 800 may further comprise internal memory 845 and/or external memory 840 that can be used to store information broadcast to the personal monitoring apparatus. External memory 840 can further be used to introduce additional information to the personal monitoring apparatus supplied from a different source, such as the Internet, vendors, or other sports enthusiasts to further personalize and enhance the users experience.

Electronic circuitry 800 of the personal monitoring apparatus may further comprise a computer network interface 850 such as an Ethernet connection, I-1394 connection, fiber connection and a modem interface 855. Such interfaces provide a user with the option of receiving or transmitting information from a telephone based or broadband-based source via the Internet. Electronic circuitry 800 may further comprise a microprocessor or similar device with other associated electronic circuitry to control the operations and features previously discussed.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. A method for selecting a media feed from a plurality of media feeds comprising the steps of:
   receiving a first media feed which is video that is transmitted wirelessly from an event venue;
   selecting a second media feed which is audio from the event venue in response to the activation of a switch, wherein the first media feed corresponds to a first Internet Protocol (IP) address and port number and the second media feed corresponds to a second IP address and a different port number;
   selecting a third media feed, wherein the third media feed is an information feed;
   mapping in response to a user command said selected second media feed and said selected third media feed with said first media feed to at least one of a soft key and part of a touch sensitive display enabling a user to select a combined media feed after said mapping operation; and
   rendering said combined media feed associated with an event at said event venue for output to an output interface when said at least one of said soft key and part of said touch sensitive display is activated.

2. The method of claim 1, wherein the method is performed in view of descriptive information that associates a media feed to a corresponding IP address and port number, such descriptive information is received before said first media feed is received.

3. The method of claim 1, wherein said IP addresses are received via a multicast transmission.

4. A personal monitoring device comprising:
   a receiver for receiving a plurality of media feeds comprising a video media feed, an audio media feed, and an information media feed where each respective media feed is assigned a unique IP address and a different port number, and said plurality of media feeds are transmitted wirelessly from an event venue;
   a memory for storing information that associates each respective media feed of said plurality of media feeds to said unique IP address and port address;
   a processor for mapping said audio media feed and said information media feed to said video media feed as a combined media feed to at least one of a soft key and portion of a part of a touch sensitive display in response to a user instruction; and
   an output device for rendering a selected combined media feed associated with an event at said event venue, wherein said media feed is selected by use of said at least one of said soft key and part of said touch sensitive display.

5. The device of claim 4, wherein said monitoring device selects a media feed from the plurality of media feeds by joining a multicast IP address and port that corresponds to said media feed.

6. The device of claim 4, wherein said output device is used to render an area that corresponds to a real time sporting event.

7. The method of claim 1, further comprising the additional step of:
   synchronizing said selected second media feed with said first received media feed using a synchronization protocol prior to said step of rendering.

8. The method of claim 1, further comprising the additional step of:
   synchronizing said first and second media feeds using a synchronization protocol prior to said step of transmitting.

9. The device of claim 4, wherein said processor synchronizes said plurality of media feeds using a synchronization protocol prior to being rendered for output on said output device.

10. The method of claim 1 further comprising an additional step of mapping, in response to a user command, a second video media feed, a second audio media feed, and a second information media feed to a second at least one of a soft key and a portion of a part of a touch sensitive display.

11. The method of claim 10 wherein said first and second mapping represent different combinations of media feeds.

\* \* \* \* \*